United States Patent
du Toit et al.

(10) Patent No.: US 9,935,879 B2
(45) Date of Patent: Apr. 3, 2018

(54) EFFICIENT INTERCEPT OF CONNECTION-BASED TRANSPORT LAYER CONNECTIONS

(71) Applicants: Roelof Nico du Toit, Portersville, PA (US); Jacques Fourie, Lynnwood Park (ZA); Peter Liudmilov Djalaliev, Pittsburgh, PA (US)

(72) Inventors: Roelof Nico du Toit, Portersville, PA (US); Jacques Fourie, Lynnwood Park (ZA); Peter Liudmilov Djalaliev, Pittsburgh, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 748 days.

(21) Appl. No.: 13/730,985

(22) Filed: Dec. 29, 2012

(65) Prior Publication Data

US 2014/0189093 A1    Jul. 3, 2014

(51) Int. Cl.
 *G06F 15/173* (2006.01)
 *H04L 12/801* (2013.01)
 *H04L 29/06* (2006.01)

(52) U.S. Cl.
 CPC .............. *H04L 47/10* (2013.01); *H04L 29/06* (2013.01); *H04L 63/0281* (2013.01); *H04L 63/0464* (2013.01); *H04L 63/0823* (2013.01); *H04L 63/166* (2013.01); *H04L 69/163* (2013.01)

(58) Field of Classification Search
 CPC ............................. H04L 69/163; H04L 47/10
 USPC ....................................................... 709/224
 See application file for complete search history.

(56) References Cited

U.S. PATENT DOCUMENTS

| | | | |
|---|---|---|---|
| 7,043,632 B2* | 5/2006 | Chapman ............ | H04L 63/0428 713/151 |
| 2003/0014624 A1 | 1/2003 | Maturana et al. ............ | 713/151 |
| 2003/0149715 A1* | 8/2003 | Ruutu et al. .................. | 709/100 |
| 2009/0268613 A1* | 10/2009 | Sagfors ......................... | 370/235 |
| 2012/0290829 A1* | 11/2012 | Altman ............... | H04L 63/1416 713/150 |

(Continued)

OTHER PUBLICATIONS

Examining SSL-encrypted Communications, the Netronome White Paper, pp. 1-10, 2008.*

(Continued)

*Primary Examiner* — Chris Parry
*Assistant Examiner* — Weiwei Stiltner
(74) *Attorney, Agent, or Firm* — Imperium Patent Works; T. Lester Wallace (57) ABSTRACT

A TCP connection is established between a client and a server, such that packets communicated across the TCP connection pass through a proxy. Based at least in part on a result of monitoring packets flowing across the TCP connection, the proxy determines whether to split the TCP control loop into two TCP control loops so that packets can be inspected more thoroughly. If the TCP control loop is split, then a first TCP control loop manages flow between the client the proxy and a second TCP control loop manages flow between the proxy and the server. Due to the two control loops, packets can be held on the proxy long enough to be analyzed. In some circumstances, a decision is then made to stop inspecting. The two TCP control loops are merged into a single TCP control loop, and thereafter the proxy passes packets of the TCP connection through unmodified.

26 Claims, 7 Drawing Sheets

ONE TCP CONNECTION - ONE TCP CONTROL LOOP (56) References Cited

U.S. PATENT DOCUMENTS

2013/0013791 A1* 1/2013 Kotecha et al. ............ 709/227
2013/0138827 A1* 5/2013 Loach ........................ 709/230
2014/0040457 A1* 2/2014 Agrawal ................ H04L 69/16
　　　　　　　　　　　　　　　　　　　　　　　709/224
2014/0089471 A1* 3/2014 Pianese et al. .............. 709/219

OTHER PUBLICATIONS

"Netronome SSL Inspector: Transparent SSL Proxy Appliance," 2010, pp. 1-2 (2 pages).
"Examining SSL-encrypted Communications: Netronome SSL Inspector Solution Overview," Netronome White Paper, 2010, pp. 1-8 (8 pages).

* cited by examiner (PRIOR ART)
FIG. 1

ONE TCP CONNECTION - ONE TCP CONTROL LOOP

FIG. 7

HOW PAYLOADS AT DIFFERENT LAYERS IN A STACK
CORRESPOND TO ONE ANOTHER

FIG. 8

ONE TCP CONNECTION - TWO TCP CONTROL LOOPS

FIG. 9

IN THIS DIAGRAM THE POLICY DECISION IS NOT TO INSPECT THE SSL SESSION, SO THE TWO CONTROL LOOPS ARE MADE ONE AGAIN

EFFICIENT INTERCEPT OF CONNECTION-BASED TRANSPORT LAYER CONNECTIONS

TECHNICAL FIELD

The described embodiments relate generally to transparent proxy devices.

BACKGROUND INFORMATION

Figure 1:
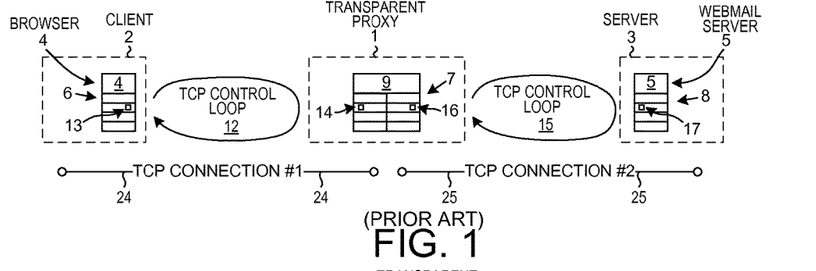
FIG. 1 (Prior Art) is a diagram that illustrates an operation of a conventional transparent proxy device.

FIG. 1 (Prior Art) is a diagram that illustrates an operation of a network device loosely referred to as a transparent proxy 1. There are many variants of transparent proxy devices. The transparent proxy 1 illustrated in FIG. 1 is but one example. In one operational example, a client device 2 is part of a company network. An application layer program 4 running on the client device 2 wishes transmit information out of the company network and across the internet to an application program 5 running on a server device 3. The application layer program 4 running on the client device 2 in this example is a web browser. The application layer program 5 running on the server device 3 in this example is a web server that serves email (i.e., a webmail server). The information to be exchanged is an email that browser 4 sends to web server 5 over an encrypted link.

A protocol processing stack 6 executes on the client device 2. A protocol processing stack 7 executes on the transparent proxy device 1. A protocol processing stack 8 executes on the server device 3. When a user uses the browser 4 to connect to the web server 5, the browser seeks to establish a TCP connection with an appropriate TCP destination port on the server device 3 so that the email can later be sent, in the form of payloads of a stream of TCP/IP packets, across the TCP connection from a source TCP port on the client device 2 to the destination TCP port on the server device 3. The TCP destination port is a TCP port associated with the web server program 5.

The protocol processing stack 7 executing in the proxy device 1, however, intercepts the client's attempt to establish the TCP connection and terminates the TCP connection on the proxy device 1, thereby establishing a first TCP connection 24 between the client device 2 and the proxy device 1. From the attempt to establish the connection received from the client device 2, the proxy device 1 learns the intended destination IP address of the server device 3 as well as the intended destination TCP port to which the client device 2 wishes to connect. The TCP processing layer of the protocol processing stack 7 executing in the proxy device 1 then initiates establishment of a second TCP connection 25 between the proxy device 1 and the TCP destination port on the server device 3. After the proxy device 1 has established the second TCP connection, information can be sent from the source TCP port on the client device 2 associated with the browser, across the first TCP connection 24 to the proxy device 1, up the stack 7 of the proxy device 1, back down the stack 7 of the proxy device 1, and then across the second TCP connection 25 from the proxy device 1 to server device 3, and up the stack 8 of the server device 3 to the desired TCP destination port of the web server application layer program 5. Similarly, application layer information can be sent in the opposite direction from the web server application program 5 executing on the server device 3, down the protocol processing stack 8 executing on the server device 3, across the second TCP connection 25 to the proxy device 1, up and down the stack 7 of the proxy device, and then across the first TCP connection 24 from the proxy device 1 to the client device 2, and up the stack 6 of the client device 2 to the application layer program 4.

To pass through the proxy device 1, the information passes up the protocol processing stack 7 of the proxy device to an application layer program 9, and then back down the protocol processing stack 7 of the proxy device and out of the proxy device. The application layer program 9 can examine the information. In one example, if information passing through the proxy device meets certain criteria, then the information is copied and is forwarded from the proxy device to a fourth device for storage and additional analysis. The existence of the proxy device 1 may be unknown both to the client device 2 and to the server device 3. Such a proxy device is therefore referred to as a transparent proxy.

Figure 2:
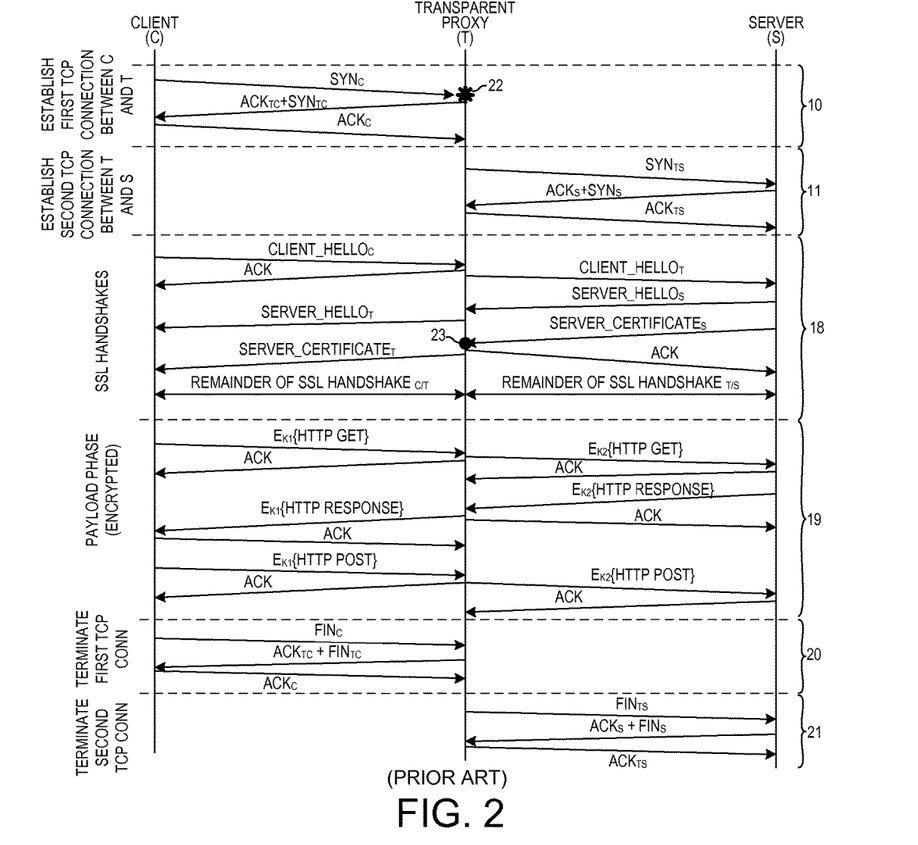
FIG. 2 (Prior Art) is a simplified diagram that illustrates the operation of the conventional proxy device of FIG. 1 in further detail.

FIG. 2 (Prior Art) is a simplified diagram that illustrates this operation in further detail. In the orientation of the diagram of FIG. 2, time extends in a downward direction. Initially, the browser 4 executing on the client 2 seeks to establish a TCP connection to the web server 5 executing on the server 3 so that the browser 4 can later send an encrypted email to the web server 5. The TCP protocol processing layer of the stack 6 causes the client 2 to transmit a $SYN_C$ segment. The $SYN_C$ segment contains the source IP address of the client 2 as well as the source TCP port associated with the browser program 4 executing on the client 2. The $SYN_C$ segment also contains the destination IP address of the server 3 as well as the destination TCP port on the server associated with the web server application layer program 5. The proxy 1, however, intercepts this $SYN_C$ segment and returns an acknowledgement segment $ACK_{TC}$ to the client as if the transparent proxy were the server. In standard fashion for establishing a TCP connection, the transparent proxy also transmits a $SYN_{TC}$ segment to the client, to which the client responds with an acknowledgement segment $ACK_C$. The first TCP connection 24 is then established between the client device 2 and the proxy 1. This SYN, ACK and SYN, ACK handshake is illustrated in portion 10 of FIG. 2. Next, proxy uses the intended TCP and IP destination information in the original $SYN_C$ segment to establish the second TCP connection 25 between the proxy and the server. The proxy therefore issues a $SYN_{TS}$ segment, to which the server responds with an $ACK_S$ and $SYN_S$. The proxy responds to the $SYN_S$ segment from the server with an $ACK_{TS}$ segment, thereby establishing the second TCP connection 25 with the server. This second $SYN_{TS}$, $ACK_S$ and $SYN_S$, $ACK_{TS}$ handshake is illustrated in portion 11 of FIG. 2. As illustrated in FIG. 1, flow control on the first TCP connection 24 between the client and proxy is managed by a first TCP control loop 12 involving a TCB 13 (Transmission Control Block) on the client and a TCB 14 on the proxy. Flow control between the proxy and the server is likewise managed by a second TCP control loop 15 involving a TCB 16 on the proxy and a TCB 17 on the server.

If the email were not to be sent over an encrypted link, then the next communication would be an HTTP request sent out from the client device, but because in this example the email being sent is to be sent over an encrypted link, the HTTPS protocol is used and a pair of SSL sessions must first be set up. The first SSL session is between the client and the proxy. The second SSL session is between the proxy and server. SSL session setup allows cryptographic parameters for a following SSL session to be exchanged, and allows the server device 3 to be authenticated. The SSL layer of the protocol stack 6 of the client 2 initiates the first SSL handshake by transmitting a $CLIENT\_HELLO_C$ message that is destined for server 3. The SSL layer is located above the TCP layer but below the application layer of the protocol stack. The client and proxy exchange SSL messages to complete a four-way SSL handshake. Similarly, the proxy and the server exchange SSL messages to complete a four-way handshake. In the illustration of FIG. 2, the two four-way handshakes are occurring at the same time. The proxy has the option to modify any part of either handshake. As indicated in FIG. 2, a server certificate SERVER_CERTIFICATE$_S$ is sent from the server to the proxy. The proxy uses information in SERVER_CERTIFICATE$_S$ to authenticate the server. The proxy modifies the information in SERVER_CERTIFICATE$_S$ to generate a SERVER_CERTIFICATE$_T$, which is different from SERVER_CERTIFICATE$_S$ but has enough similarities to impersonate the server. The proxy sends the SERVER_CERTIFICATE$_T$ to the client device. The client device 2 uses information in SERVER_CERTIFICATE$_T$ to authenticate the proxy.

At this point, a policy stored on the proxy server can be applied to the SERVER_CERTIFICATE$_S$ to determine how the information passing between the client and server is to be handled. This decision point is indicated in FIG. 2 with the large dot symbol 23. As a result of the SSL session setup process, the client device 2 has generated an SSL session cryptographic parameter set K1 and the server device 3 has generated an SSL session cryptographic parameter set K2. The SSL session cryptographic parameter sets K1 and K2 are later used by the client and server to send encrypted data payloads to each other during the SSL session.

After the two SSL four-way handshakes have been completed, the client device 2 can use its cryptographic parameter set K1 to send encrypted information to the server device 3 in the form of encrypted SSL messages. The notation E$_{K1}$ {HTTP GET} indicates that an HTTP GET application layer message is encrypted with the client's SSL session cryptographic parameter set (K1). The transparent proxy 1 receives the HTTP GET message in the form of several encrypted SSL messages. For each SSL message, the proxy returns an ACK to the client. Substantial time may be required for the proxy to receive and decrypt the SSL messages that carry the overall HTTP GET. Several TCP/IP packets may have to be held in the proxy before decryption of an SSL message can occur. If TCP/IP packets are delayed and not ACKed back to the client device, then operation of the TCP control loop between the client and proxy may be unduly disturbed. Due to the existence of the first TCP control loop 12, however, the packets that carry the HTTP GET can be ACKed, such that the payloads of these several packets are held in the proxy 1 until enough information is held an SSL message. The proxy 1 then uses cryptographic parameter set K1 to decrypt each SSL message. In the example of FIG. 2, the combined decrypted payloads of the SSL messages together form the HTTP GET application layer message from the client.

Once the HTTP GET application layer message has been recovered at the application layer 9 in the proxy, the application layer program 9 can analyze the message. The HTTP GET message is also broken back down into smaller blocks of data. Each smaller block is encrypted using the cryptographic parameter set K2 to form an SSL message. In the illustrated example, the notation E$_{K2}$ {HTTP GET} indicates the HTTP GET message is encrypted using the cryptographic parameter set K2. The HTTP GET message is sent from the proxy 1 to the server device 3 in the form of many encrypted SSL messages, where SSL messages are sent as TCP/IP packets. In the receiving server device 3, the TCP/IP packets pass up protocol stack 8 to form SSL messages. The SSL layer of step 8 decrypts the SSL messages. The resulting unencrypted SSL message payloads are assembled to form the HTTP GET application layer message. The communication of the payload information across the encrypted link is illustrated in portion 19 of FIG. 2.

As the information passes through the proxy, the information passes up the stack 7 to the application layer program 9 running on the proxy 1, and then back down the stack 7 and out of the proxy. The application layer program 9 of the proxy 1 has access to the application layer message in unencrypted form. If the application layer message meets certain criteria, then the transparent proxy 1 may cause certain of the information to be copied elsewhere for future reference and analysis.

In the present example, the HTTP GET message from the client 2 is a request that the web server 5 on server 3 return an HTML form. The web server 5 returns the HTML form in a HTTP RESPONSE communication. When browser 4 on client 2 receives the form, the user uses browser 4 to compose an email. After typing the email into a field of the form, the user selects the submit button. When the user selects the submit button on the form, the browser 4 causes the form to be transferred in an HTTP POST communication from the client device 2 across the TCP connections 24 and 25 to the webserver 5 executing on server device 3. The HTTP POST is communicated as the payloads of a stream of SSL messages to the transparent proxy 1. The HTTP POST passes up the stack 7 to the application layer 9 of the proxy, and then back down stack 7. The HTTP POST is communicated as the payloads of a stream of SSL messages from proxy 1 to the server device 3. The HTTP POST passes up stack 8 and is presented to the web server application 5.

In the present example, after successful receipt of the email by the web server application layer program 5 executing on server device 3, the application layer program executing on either the client or the server initiates termination of the TCP connection mechanism. In the illustrated example, browser program 4 executing on client device 2 causes the TCP protocol processing layer of stack 6 to transmit a FIN$_C$ segment destined for the server device and the TCP port of the web server. The proxy 1, rather than forwarding the FIN$_C$ segment, returns an ACK$_{TC}$ segment to the client along with a FIN$_{TC}$ segment and in accordance with standard TCP protocol terminated the first TCP connection between the client and proxy. This is unknown to the server. After termination, the client does not know that there still exists a second TCP connection between the proxy and the server. Termination of the first TCP connection 24 is illustrated in portion 20 of FIG. 2. The proxy 1 then initiates termination of the second TCP connection 25 between the proxy 1 and the server device 3 by transmitting a second FIN$_{TS}$ segment to the server device 3 and TCP port of the web server. The server device 3 returns an ACK$_S$ to the proxy along with a FIN$_S$ segment. The proxy returns an ACK$_{TS}$ segment in accordance with standard TCP protocol to terminate the second TCP connection. After the standard TCP connection termination handshake has occurred, both TCP connections 24 and 25 are terminated. Memory resources on the client device, proxy device, and server device used to store the TCBs for the two TCP control loops may be reused for other purposes. Processing resources on the proxy device that would otherwise have to be used to maintain TCP connection state can be used for other purposes.

In the example of FIGS. 1 and 2, proxy 1 makes a determination at the time it receives the SYN$_C$ segment that the flows for the upcoming TCP connection are to be analyzed, and that this analysis will require that the two TCP connections 24 and 25 be established. The asterisk 22 in FIG. 2 indicates this decision point. By the time proxy 1 has received the actual SERVER_CERTIFICATE$_S$ from the server device 3 and can confirm that an SSL session will in fact be established, the two TCP connections 24 and 25 have already been established. The two TCP connections, and the four associated TCBs 13, 14, 16 and 17 are used for communication between browser 4 and web server 5 until either the browser or web server initiates termination of a TCP connection.

SUMMARY

A TCP connection is established between a client device and a server device, such that IP packets communicated across the TCP connection pass through a transparent proxy device. The transparent proxy device monitors the IP packets but does not terminate the TCP connection and is not involved in TCP connection establishment. During TCP connection establishment and thereafter, the proxy device monitors the IP packets. Based at least in part on a result of the monitoring of the IP packets flowing across the TCP connection, the proxy device determines whether to split the TCP control loop into two TCP control loops so that information communicated across the TCP connection can be inspected more thoroughly. In one example, if a packet/packets communicated across the TCP connection has/have a particular signature (for example, an SSL signature), then the proxy device determines to split the TCP control loop into two TCP control loops.

If the TCP control loop is split, then a first TCP control loop manages flow control between the client device and the proxy device and a second TCP control loop manages flow control between the proxy device and the server device. The first TCP control loop involves the initial TCP TCB (Transmission Control Block) on the client device and a new first TCP TCB on the proxy device. The second TCP control loop involves a new second TCP TCB on the proxy device and the initial TCP TCB on the server device. Packets passing back and forth between the client device and the server device across the TCP connection are monitored by the proxy device to collect status information adequate to initialize these new first and second TCP TCBs.

Due to use of the two TCP control loops, packets of the TCP connection passing through the proxy device can then be held on the proxy device long enough that substantial analysis can be performed on the packets. The proxy device can receive a packet and ACK receipt of the packet, and can then hold the packet for a while, before the proxy device forwards the packet on to its originally intended destination. Not only can packets be held, but the proxy device can also modify payload length without disrupting what would otherwise be a single TCP control loop between client device and server device.

In one example, packets are held on the proxy device long enough that information carried in the packets can be decrypted. The proxy device obtains the decryption parameter sets necessary to perform the decryption by virtue of the proxy device intercepting traffic between the client device and the server device during SSL session setup. When the decrypted results accumulate in the proxy device to form a larger message, then the information carried by the held packets is sent in the form of packets onward across the TCP connection out of the proxy device and to the original destination of the original encrypted packets. In addition, the proxy device forwards the larger message in unencrypted form to a recording device for storage and/or further analysis. In this way, the proxy device intercepts the TCP traffic, decrypts it, and causes it to be copied before sending the TCP payload information onward to its originally intended destination. The proxy device makes a decision, based at least in part on the result of the analysis of the packets, such as: whether packets of the TCP connection should thereafter be forwarded on without interception, whether packets of the TCP connection should be intercepted and also forwarded on, whether the packets of the TCP connection should be intercepted and forwarded on and also forwarded to a recording device, or whether packets of the TCP connection should be dropped and not forwarded.

In some circumstances, after a period of time of maintaining the TCP connection using two TCP control loops, the proxy device makes a determination that packets of the TCP connection no longer need to be intercepted. The determination to stop intercepting packets can be made early in the process before intercepted information is forwarded to the recording device, or the determination to stop intercepting packets can be made later in the process after TCP traffic has been intercepted, inspected, and copied for some time. The determination to stop intercepting and inspecting may be made based at least in part on a result of decrypting information of the TCP connection. If the proxy device determines to stop inspecting packets of the TCP connection, then the proxy device causes the two TCP control loops to be merged into a single TCP control loop. After the merging, packets of the TCP connection pass through the proxy device unmodified without a second TCP connection ever being used to communicate any of the TCP connection payload information between the client device and the server device.

The proxy device may initially decrypt and inspect some information passing across a TCP connection, and then based at least in part on this inspection determine that future packets of the TCP connection do not thereafter need to be inspected. Inspection of the TCP connection is terminated without having to continue to maintain any TCP TCBs on the proxy device for the TCP connection. Memory space and processing resources previously used to maintain such TCP TCBs for the TCP connection can then be used for other purposes. At no point is the TCP connection terminated on the proxy device. The original TCP connection between the client device and the server device is maintained even though for a period of time information being communicated across the TCP connection was decrypted and analyzed by the proxy device.

Packets of many TCP connections typically pass through the proxy device. The proxy device may initially, for a brief amount of time, inspect a few packets of each TCP connection to determine whether packets of that particular TCP connection should be intercepted or not. At a given time, packets of some of the many TCP connections are being intercepted, analyzed, and copied, whereas packets of others of the many TCP connections are simply being forwarded through the proxy device unmodified and uninspected.

Regardless of whether the proxy device continues to inspect packets or not, when a TCP connection is no longer needed then either the client device or the server device initiates TCP connection termination and the TCP connection is terminated.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
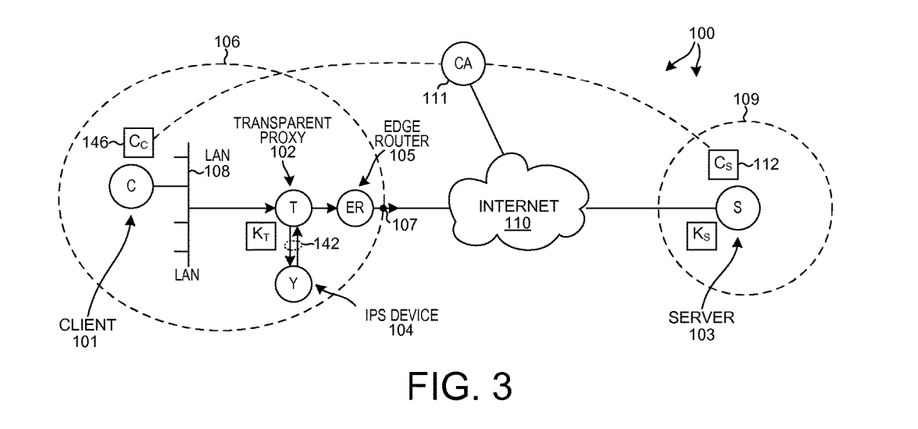
FIG. 3 is a diagram of a system that includes a novel transparent proxy device in accordance with one novel aspect.

FIG. 3 is a diagram of a system 100 that includes a novel transparent proxy device in accordance with one novel aspect. System 100 includes a first network device 101, a second device network device 102, a third network device 103, a fourth network device 104, and a fifth network device 105. In this example, first network device 101 is a client device, second network device 102 is the novel transparent proxy device, third network device 103 is a server device, fourth network device 104 is an IPS (Intrusion Prevention System) and recording device, and fifth network device 105 is an edge router. Dashed line 106 represents the boundary of a first company or organization. Dot 107 identifies an edge of the network of the first organization through which communications between the company 106 and the internet 110 pass. Client device 101 can communicate with the transparent proxy 102 and other devices of the first organization via a Local Area Network (LAN) 108. Dashed line 109 represents a second company or organization. The client device 101 and the server device 103 can communicate through the internet 110 with each other and with a trusted third party device 111. The trusted third party issues a server certificate $C_S$ 112 that is provided to server device 103. The trusted third party provides to client device 101 a publicly available digital X.509 root CA certificate $C_C$. Most browsers come with a preconfigured certificate store that contains known, trusted root CA certificates, of which $C_C$ is one.

Figure 4:
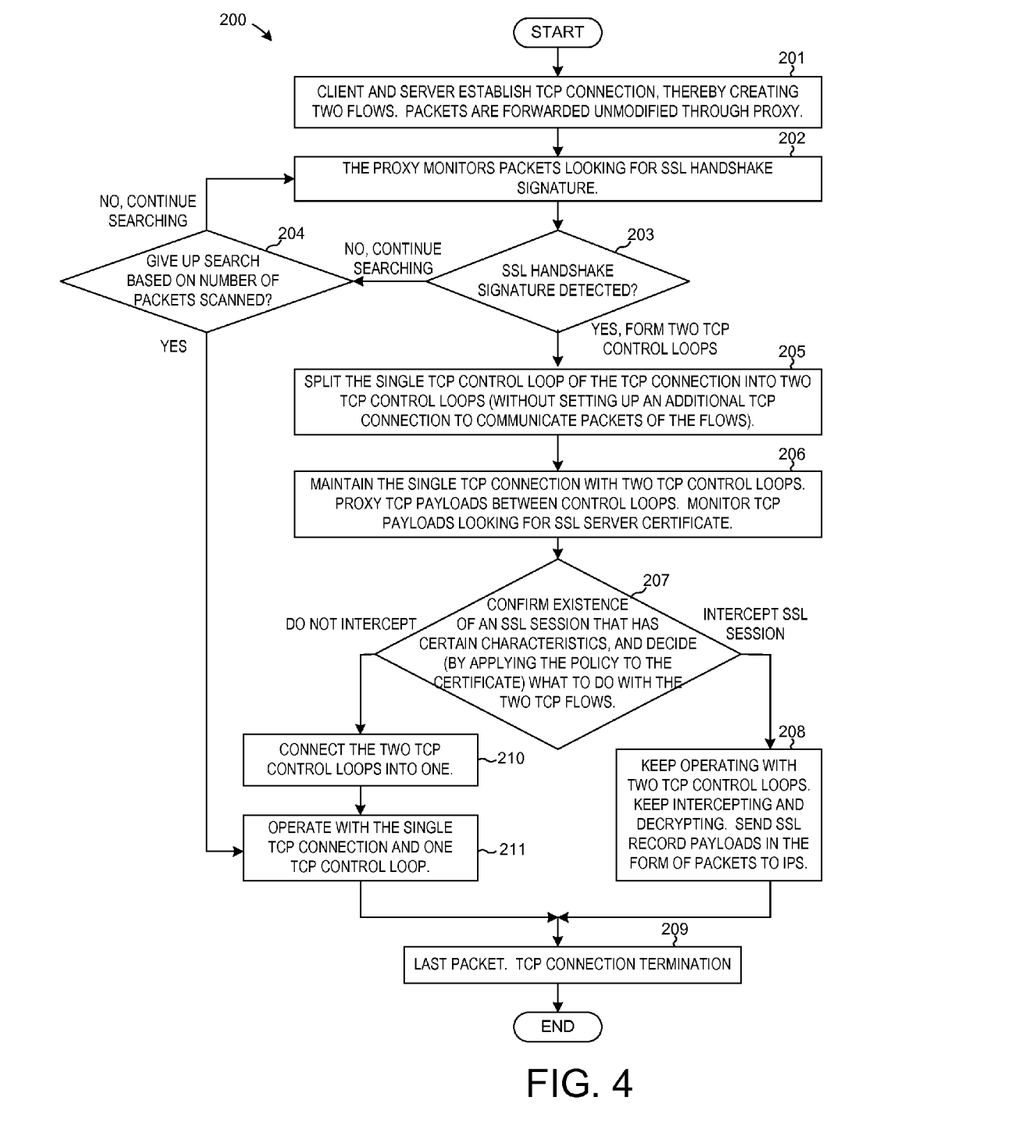
FIG. 4 is a flowchart of a method of an operation of the novel transparent proxy device of FIG. 3.

FIG. 4 is a flowchart of a method 200 of operation of the system 100 of FIG. 3. In this example, a user of client device 101 uses a web browser application layer program 113 to interact with a web mail server application layer program 114 executing on server device 103. The user does this to initiate composition of an email. As a result, the TCP (Transmission Control Protocol) protocol processing layers 115 and 116 of the client 101 and server 102 engage in a three-way handshake process to establish a TCP connection 117 (step 201), thereby creating two flows of IP (Internet Protocol) packets 118 and 119. Each flow has its own sequence space. IP packets of the first flow 118 are identified to be of the flow by a so-called 5-tuple: 1) a TCP source port on client device 101 identified with the web browser application layer program 113, 2) the IP source address that identifies the client device 101, 3) a TCP destination port on the server device 103 identified with the web mail server application layer program 114, 4) the IP destination address that identifies the server device 103, and 5) the application layer protocol. IP packets of the second flow 119 are identified to be of the flow by a so-called 5-tuple: 1) a TCP source port on server device 103 identified with the web mail server application layer program 114, 2) the IP source address that identifies the server device 103, 3) a TCP destination port on the client device 101 identified with the web browser application layer program 113, 4) the IP destination address that identifies the client device 101, and 5) the application layer protocol.

Figure 5:
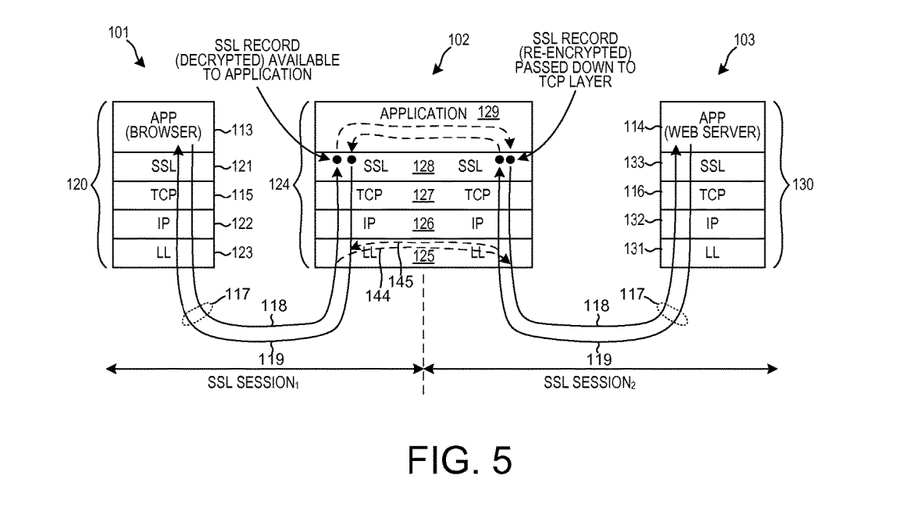
FIG. 5 is a diagram that illustrates how the two flows of a TCP connection pass between the client device and the server device through the novel transparent proxy device of FIG. 3.

FIG. 5 is a diagram illustrates these two flows 118 and 119 of packets. A stack 120 of network protocol processing layers 123, 122, 115, 121 and 113 executes on the client device 101. A stack 124 of network protocol processing layers 125-129 executes on the proxy device 102. A stack 130 of network protocol processing layers 131, 132, 116, 133 and 114 executes on the server device 103. TCP works by exchanging pieces of information most properly referred to as segments. A SYN segment, a SYN-ACK segment, and an ACK segment that pass back and forth between the client device and the server device to cause the TCP connection 117 to be established. SYN and ACK are flags in the TCP header, consequently SYN-ACK is one TCP segment with both of these flags set. An individual TCP segment is encapsulated into one or more IP packets that are then forwarded through the proxy device 102 in unmodified form. This pass through the proxy device 102 in unmodified form is indicated by dashed arrows 144 and 145. Although the packets pass through unmodified, this does not preclude the proxy device from looking at the packets on all levels (IP, TCP, SSL).

In the TCP establishment process, the client device 101 first sends the server device 103 a SYN segment. This SYN segment of the first flow 118 passes from the TCP layer 115 of stack 120, down through the various network processing layers of the stack 120, then across LAN 108 to proxy device 102 in the form of an IP packet. The IP packet then passes through the proxy device unmodified as indicated by dashed arrow 145, and is then communicated via the internet 110 to the server device 103, and then passes up through the various network processing layers of the stack 130 of the server device 103 to the TCP protocol processing layer 116. The server device 103 responds by acknowledging receipt of the SYN segment by sending the client device 101 a SYN-ACK segment. This SYN-ACK segment is to acknowledge receipt of the first SYN segment, and to send a SYN to the client device. This SYN-ACK segment of the second flow 119 passes down the protocol processing layers of stack 130, is encapsulated into an IP packet, and is communicated as the IP packet to the proxy device 102, and through the proxy device 102 unmodified as indicated by dashed arrow 145, and then to the client device 101 as the IP packet, and then up through the protocol processing layers of stack 120 to the TCP protocol processing layer 115. In response, the client device 101 acknowledges receipt of the SYN portion of the SYN-ACK segment by sending an ACK segment back to the server device 103. This ACK segment of the first flow 118 is communicated in the same way that the first SYN segment to the server device 103. It passes as an IP packet via the proxy device 102 to the TCP protocol processing layer 116 of the server device 103 without being modified by the proxy device. This SYN, SYN-ACK, and ACK sequence is the standard 3-way handshake for establishing a TCP connection.

Figure 6:
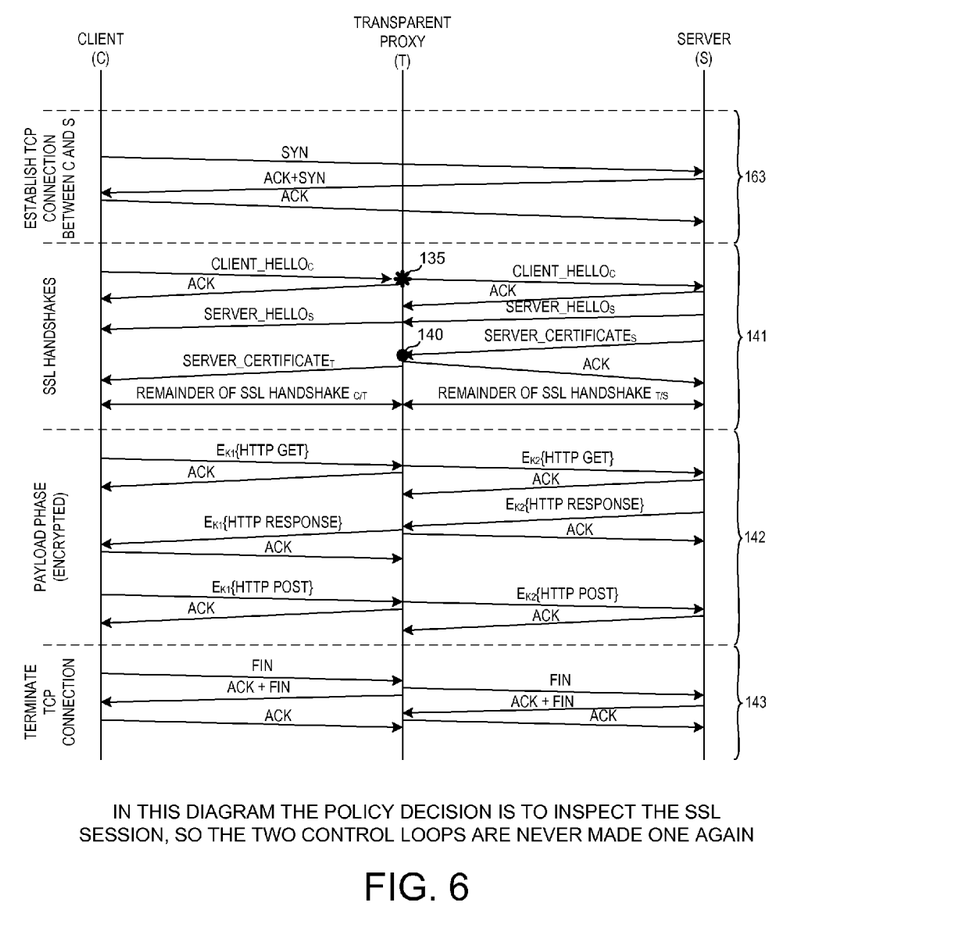
FIG. 6 is a diagram that illustrates an operation of the novel transparent proxy device of FIG. 3 in which a single TCP control loop is split into two TCP control loops and then the two TCP control loops are never combined again.

As shown in FIG. 6, the SYN, SYN-ACK, and ACK segments that establish the TCP connection 117 during time period 163 are communicated encapsulated in IP packets, and these IP packets are not modified by the transparent proxy device 102, but rather are forwarded through the proxy device 102 unmodified.

Figure 7:
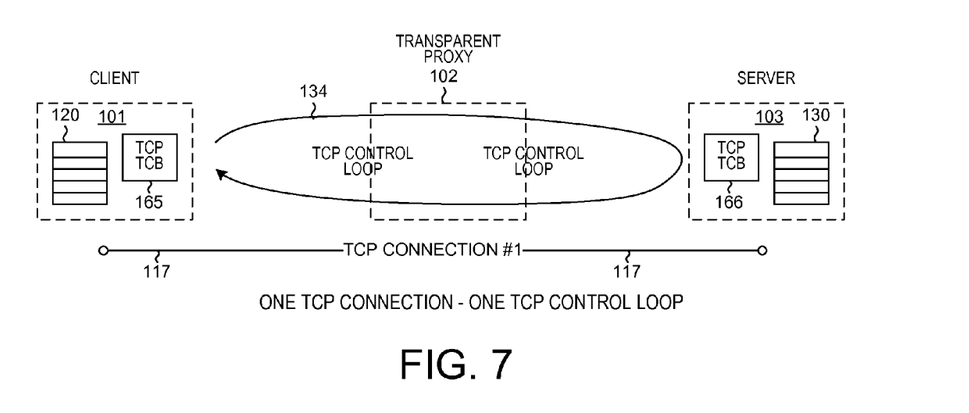
FIG. 7 is a diagram that illustrates one TCP connection operating with one TCP control loop, where packets of the TCP connection pass back and forth through the novel transparent proxy of FIG. 3.

FIG. 7 is a diagram that illustrates the TCP connection 117 that is established during time period 163 between the client device 101 and the server device 103. A TCP Transmission Control Block (TCB) 165 is initialized on the client device 101. This TCP TCB 165 is utilized by the TCP protocol processing layer 115 of the stack 120 of the client device. A TCP TCB 166 is initialized on the server device 103. This TCP TCB 166 is utilized by the TCP protocol processing layer 116 of the stack 130 of the server device 103. The TCP and IP protocol processing layers of the two stacks 120 and 130 work together to implement a TCP control loop 134 that manages flow of data between the client device and the server device via the two flows 118 and 119 of the TCP connection 117. The TCP control loop utilizes a sliding window flow control mechanism to prevent the TCP sender from sending data too fast for the TCP receiver. In a TCP segment sent out from the TCP receiver, the TCP receiver specifies an amount of additional data it is willing to receive. The TCP sender can send only up to that amount of data before the TCP sender must wait for an ACK and window update from the TCP receiver.

In the example being described here, the browser program 113 will later communicate with the web mail server program 114 across an encrypted link. In order to set up this encrypted link, the client device 101 and the server device 103 endeavor to establish an SSL (Secure Sockets Layer) session between them. (The term SSL as it is used in this patent document is a general term that refers to any member of the family of SSL, TLS (Transport Layer Security) and WTLS (Wireless Transport Layer Security) related protocols, including for example SSL 2.0, SSL 3.0, TLS 1.0, TLW 1.2 and WTLS 1.1.) Accordingly, as shown in FIG. 6, the client device sends a CLIENT_HELLO$_C$ message that it believes is destined for the server device.

Figure 8:
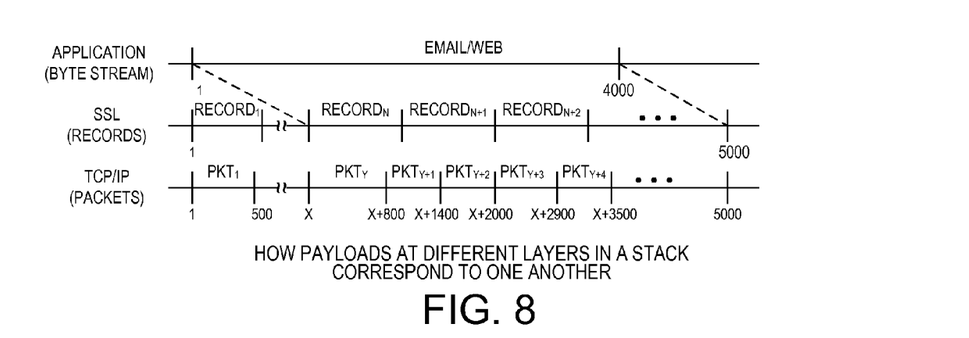
FIG. 8 is a diagram that illustrates how an application layer payload, such as an email payload of an HTTP message, is sectioned up into records at the SSL protocol layer, and is further sectioned up into packet payloads at the TCP/IP packet layer.

In the present legal intercept example involving proxy device 102, however, the proxy device 102 examines information both going into, and coming out of, company 106. In the present example, an email will be sent out of the client device 101 to the server device 103. FIG. 8 illustrates how an application layer payload, such as an email payload of an HTTP (Hypertext Transfer Protocol) message, is sectioned up into smaller pieces of information, each of which becomes the payload of an SSL record. The payload of each SSL record is encrypted. The resulting SSL records are further sectioned up into TCP segments, that are encapsulated with IP headers to become IP packets. The bottom line of the figure indicates the transmission of IP packets PKT$_1$, PKT$_2$, and so forth. These IP packets carry encrypted SSL payload. When received, the IP headers are removed such that the IP payloads form TCP segments. The SSL protocol processing layer extracts payload from the TCP segments, and reassembles SSL records. SSL records include the following components: SSL record header (which encodes the length of the record, from 0 to 18432 octets), SSL record payload, and SSL record MAC (a footer). Once the SSL protocol processing layer has a full SSL record, it is able to decrypt and verify the SSL record payload. The SSL protocol processing layer then passes up to the application layer only the decrypted payload portion of the SSL record. The decrypted payload portions of SSL records are combined to form the application layer payload, which in the example of FIG. 8 is an email. Note from FIG. 8 that the boundaries of the data contents of the IP packets do not have to align with the boundaries of the data contents of the SSL records. In the present example, an email is to be sent out of the company 106 across an encrypted link to a Google email (web mail) application layer program 114 executing on server device 103. The encrypted IP packets carrying the email, however, are intercepted by proxy device 102, and the SSL layer payload carried by the stream of IP packets is decrypted, and the decrypted SSL layer payload is forwarded to the IPS recorder device 104 for future reference and analysis. IPS recorder device 104 performs TCP reassembly, but not TCP termination. In the illustrated example, there is no TCP control loop between T and Y. Arrows 164 represent a stream of IP packets that can be used to reconstruct the decrypted email message.

Accordingly, step 202 of FIG. 4 involves the proxy device 102 monitoring communications across the TCP connection 117 looking for the signature of an SSL handshake. IP packets carrying SSL data have a specific format. The proxy device 102 looks at the first five bytes of the TCP payload inside each IP packet, and more specifically the first five bytes of SSL record header, to determine whether these five bytes correspond with the specific format. The first five bytes have characteristics that make it possible to identify the start of a potential SSL handshake. During this monitoring, the proxy device 102 in the present example detects a CLIENT_HELLO$_C$ message that was sent by the client device 101. At this point, the proxy device 102 decides that the start of an SSL message has most likely been detected, for example by use of heuristics to identify potential SSL packets. In FIG. 6 this decision time (when proxy device 102 detects the SSL signature) is indicated by asterisk symbol 135. This corresponds to step 203 in the flowchart of FIG. 4.

As a result of the decision that an SSL signature has been detected, the proxy device splits (step 205) the single TCP control loop 134 of TCP connection 117 into two TCP control loops 136 and 137 without establishing a second TCP connection. The original one TCP control loop is not merely tricked, or manipulated, or segments controlled by it delayed or modified to affect TCP control loop operation, but rather there are two separate TCP control loops after the split. The IP source and destination addresses and the TCP source and destination ports of the single TCP connection 117 remain unchanged.

As shown in FIG. 6, the proxy device 102 ACKs the packets carrying the CLIENT_HELLO$_C$ message, and forwards the CLIENT_HELLO$_C$ message to the server device 103. In accordance with the SSL handshake protocol, the server device 103 responds by sending the client device a SERVER_HELLO$_S$ message. The proxy device 102 ACKs the packets carrying the SERVER_HELLO$_S$ message, and forwards the SERVER_HELLO$_S$ message to the client device 101.

Figure 9:
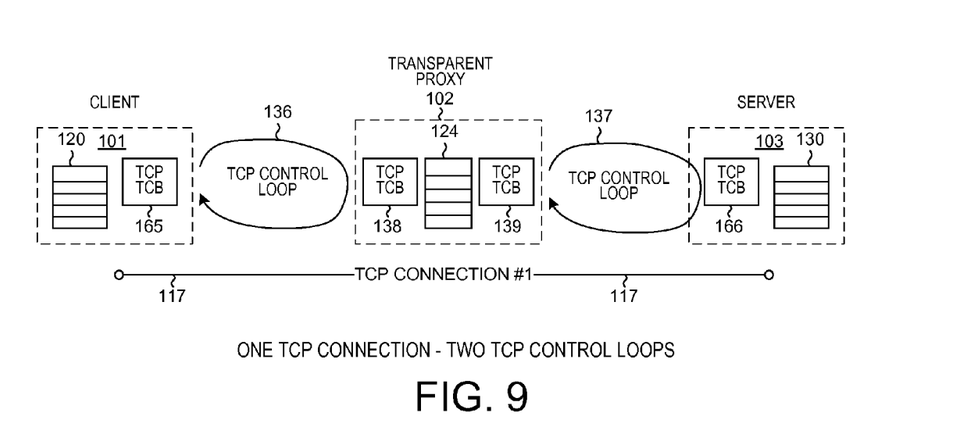
FIG. 9 is a diagram that illustrates one TCP connection operating with two TCP control loops, where packets of the TCP connection pass back and forth through the novel transparent proxy of FIG. 3.

FIG. 9 illustrates the proxy device 102 operating using these two TCP control loops 136 and 137. To support the first TCP control loop 136, the proxy device 102 must maintain a TCP TCB 138. To support the second TCP control loop 137, proxy device 102 must maintain a TCP TCB 139. The proxy device 102, however, does not have access to the TCP TCBs 165 and 166 of the client and server devices in order to copy the current states of these TCBs. The proxy device 102, however, does have access to all the IP packets passing back and forth between client device 101 and server device 103 across the TCP connection. The proxy device 102 monitors traffic flowing in both directions, and records information about the TCP connection as packets flow through the proxy device to determine what the internal states of the client and server TCP control blocks on either end of the TCP connection should be. At the point where the TCP control loop is to be split (indicated in FIG. 6 by asterisk 135), the proxy device 102 uses all the tracking and status information collected up to that point, including such things like SYN information, acknowledgement sequence numbers, window scale, all the TCP options, and advertised TCP windows, to initialize a client TCP control block 139 that is a copy of what the proxy device 102 thinks the client TCP control block 165 is. Similarly, the proxy device 102 initializes a server TCP control block 138 that is a copy of what the proxy device 102 thinks the server TCP control block 166 should be. After the split, information in the two TCP control blocks 165 and 139 will start to differ as the two control loops 136 and 137 begin to operate independent of one another. Similarly, after the split, information in the two TCP control blocks 138 and 166 will start to differ as the two control loops 136 and 137 begin to operate independent of one another. Due to this background monitoring and initializing of shadow TCP TCBs, when the proxy device 102 detects the first "CLIENT_HELLO$_C$" message of the SSL handshake from the client, the proxy device 102 can split the TCP control loop. As shown in FIG. 6, proxy device 102 then forwards the "CLIENT_HELLO$_C$" message to the server device 103. Flow control of the portion of the TCP connection between proxy device 102 and server device 103 is managed by the new second TCP control loop 137.

At this point in the method of FIG. 4, the single TCP connection is being maintained with two separate TCP control loops (step 206). The SSL handshake process continues as indicated in FIG. 6 across the same one TCP connection, but using two TCP control loops. As the SSL handshake continues, the proxy device 102 takes the payloads received from the client device 101 and sends those payloads out to the server device 103 on the other side of the proxy device. Likewise, as the SSL handshake continues, the proxy device 102 takes the payloads received from the server device 103 and sends those payloads out to the client device 101 on the other side of the proxy device. This is what is referred to in the flowchart of FIG. 4 as "proxy TCP payloads". While proxying the TCP stream, the proxy device 102 scans each TCP payload looking for a SSL server certificate.

As indicated by the arrow labeled SERVER_CERTIFICATE$_S$ in FIG. 6, a server certificate is sent as part of the SSL session setup procedure to the proxy device 102. The company has previously configured the proxy device 102 so that the proxy device 102 stores a policy. Within the proxy device 102, the server certificate is forwarded to a policy engine within the proxy device. The policy engine applies the policy (step 207) to the server certificate SERVER_CERTIFICATE$_S$, thereby making a decision. The dot 140 in FIG. 6 indicates the decision point of step 207 of FIG. 4. In the present example, the decision is a confirmation that an SSL session is being set up on the TCP connection, along with a verdict (step 207). The verdict may be, or include, a determination to take a particular action. Some exemplary verdicts include a determination: to pass the flows of the TCP connection through the proxy device (pass through) without inspection, to intercept and inspect the flows of the TCP connection, to drop the flows of the TCP connection (block), to intercept and to modify a payload of the TCP connection before forwarding the payload on, to intercept and to add information to a payload of the TCP connection before forwarding the payload on, to intercept and to subtract information from a payload of the TCP connection before forwarding the payload on. In the present example, the verdict is to intercept SSL records, to perform decryption, to analyze the result, to forward the traffic on and also to forward the decrypted result to a recording device.

In the particular example being described where it is confirmed that an SSL session is being set up and where the verdict indicates that the flows of the TCP connection should be inspected, each IP packet of the flow 119 and flow 118 thereafter received onto the proxy device 102 is intercepted (step 208), and the payloads of the resulting TCP segments are reassembled into SSL records. Once an SSL record has been reassembled, it is decrypted (step 208) and its decrypted payload is passed up to application layer 129 of the proxy device 102, and is also forwarded from the proxy device 102 to the ISP recorder device 104. The SSL record is forwarded by breaking the decrypted SSL record into smaller blocks of information so that each such smaller block of information can be sent to the ISP recorder device 104 as an IP packet. The IPS recorder device 104 receives the IP packets, and from the payloads of the IP packets reassembles the unencrypted application layer payload.

In addition to using the SERVER_CERTIFICATE$_S$ to authenticate the server, the proxy device modifies the information in SERVER_CERTIFICATE$_S$ to generate a SERVER_CERTIFICATE$_T$, which is different from SERVER_CERTIFICATE$_S$ but has enough similarities to impersonate the server. This generation of SERVER_CERTIFICATE$_T$ may involve a payload length modification that without the two TCP control loops might disrupt a single TCP control loop. The proxy device then sends the SERVER_CERTIFICATE$_T$ to the client device. The client device 101 uses information in SERVER_CERTIFICATE$_T$ to authenticate the proxy, not knowing that it is not authenticating the original server.

In FIG. 6, once the two SSL sessions have been set up during time period 141, the web browser 113 outputs a HTTP GET application layer message. This HTTP GET application layer message is a request that the web mail server 114 return a fillable form. The SSL layer 121 of stack 120 encapsulates the HTTP GET in encrypted SSL records using cryptographic parameter set K1, which was negotiated between client device 101 and proxy device 102 during time period 141. The IP packets that contain the SSL records flow to proxy device 102, where the SSL records are reassembled by SSL layer 128 of stack 124, and ultimately into the application layer data that is then available to the application layer program 129 executing on the proxy device. The HTTP GET message passes back down through stack 124, and is again encapsulated in SSL records in SSL layer 128, but this time using cryptographic parameter set K2, which was negotiated between proxy device 102 and server device 103 during time period 141. The SSL records are sent from the proxy device 102 in the form of IP packets to the server device 103.

Cryptographic parameter sets K1 and K2 are calculated as part of the SSL handshake(s). K1 and K2 are not individual keys, but rather are a set of cryptographic parameters which include (for each of K1 and K2): encrypt and decrypt keys, encrypt and decrypt initialization vectors, and MAC secrets. How to calculate K1/K2 is described in detail in the TLS specification. Whereas K1 and K2 refer to the session parameter sets used in symmetric encryption of SSL record payloads, $K_T$ and $K_S$ (see FIG. 3) refer to asymmetric private keys (e.g. RSA private keys) used only in the SSL handshake. K1 and K2 are different for every SSL session. $K_T$ and $K_S$, on the other hand, do not change unless the server device is reconfigured. $K_S$ is installed on the server device as part of server configuration. $K_T$ is installed on the proxy device a part of the SSL rule set configuration.

As shown in FIG. 6, server device 103 receives IP packets, and recovers the HTTP GET from the SSL records. The web mail server program 114 of the server device 103 responds by sending the requested form as part of an HTTP RESPONSE message. The HTTP RESPONSE message passes back down stack 130 and is communicated as IP packets. The proxy device 102 receives the IP packets, reassembles the SSL records and decrypts them, and ultimately reassembles the application layer HTTP RESPONSE message. The HTTP RESPONSE message is made available to the application layer program 129 executing on the proxy device. The HTTP RESPONSE message passes back down the stack 124 of the proxy device, is encapsulated in SSL records using cryptographic parameter set K1, and is carried in IP packets to the client device 101. The packets are used to reassemble the SSL records, which are decrypted, and the decrypted payloads assembled to recover the HTTP RESPONSE that in turn is presented to the web browser application layer program 113. The HTTP RESPONSE contains a fillable form. The web browser 113 renders the fillable form on a display to the user. The fillable form has a field into which the user can type an email message. The user types an email message into the field, and then selects a submit button using the browser. In response to the selecting of the submit button, the browser 113 sends an HTTP POST message back to the server device 103. As indicated in FIG. 7, the HTTP POST is carried in the form of IP packets. The proxy device 102 receives these encrypted SSL records, decrypts them, reassembles the HTTP POST application layer payload information, and presents the HTTP POST in unencrypted form to the application layer 129 program executing on the proxy device. This information includes the body of the email in unencrypted form.

In accordance with the verdict decided at 140, the unencrypted SSL messages that carry the email content are sent from proxy server 102 via a dedicated physical link 164 to the IPS device 104, where the IPS device can inspect the email content before passing it back to the proxy device 102. The HTTP POST application layer data (that includes the body of the email) is passed back down the stack 124 of the proxy device 102, and is communicated as encrypted (using cryptographic parameter set K2) SSL records in IP packets to the server device 103. The IP packets are processed up the stack 130 of the server device 103 so that the HTTP POST is presented to the web mail server application layer program 114. At this point, communication of the email from the client device to the server device is complete, but due to the intervening proxy device 102 the proxy device 102 decrypted messages passing across the SSL secure link and forwarded the messages in unencrypted form to the IPS device 104 for recording and analysis. One of these messages contained the body of the email. Communication of the email occurred during the payload phase time period 142 of FIG. 6.

After the email has been communicated from client device 101 and server device 103, then either the client or the server will initiate termination and tear down of the TCP connection 117. It is up to the application layer programs running in the endpoints which of the two endpoints will send a FIN segment first. Termination of the TCP connection is initiated by the sending of a FIN segment from either the client or server. The other endpoint then responds and sends its own FIN segment. The TCP connection is taken down in conventional fashion from the perspective of the two endpoints. Termination of the TCP connection occurs during the time period 143 in FIG. 6.

If in step 207 of the flowchart of FIG. 4, the decision at decision point 140 (see the dot 140 in FIG. 6) is not to intercept records of the SSL session, then the two TCP control loops 136 and 137 are connected (step 210) to form one TCP control loop.

Figure 10:
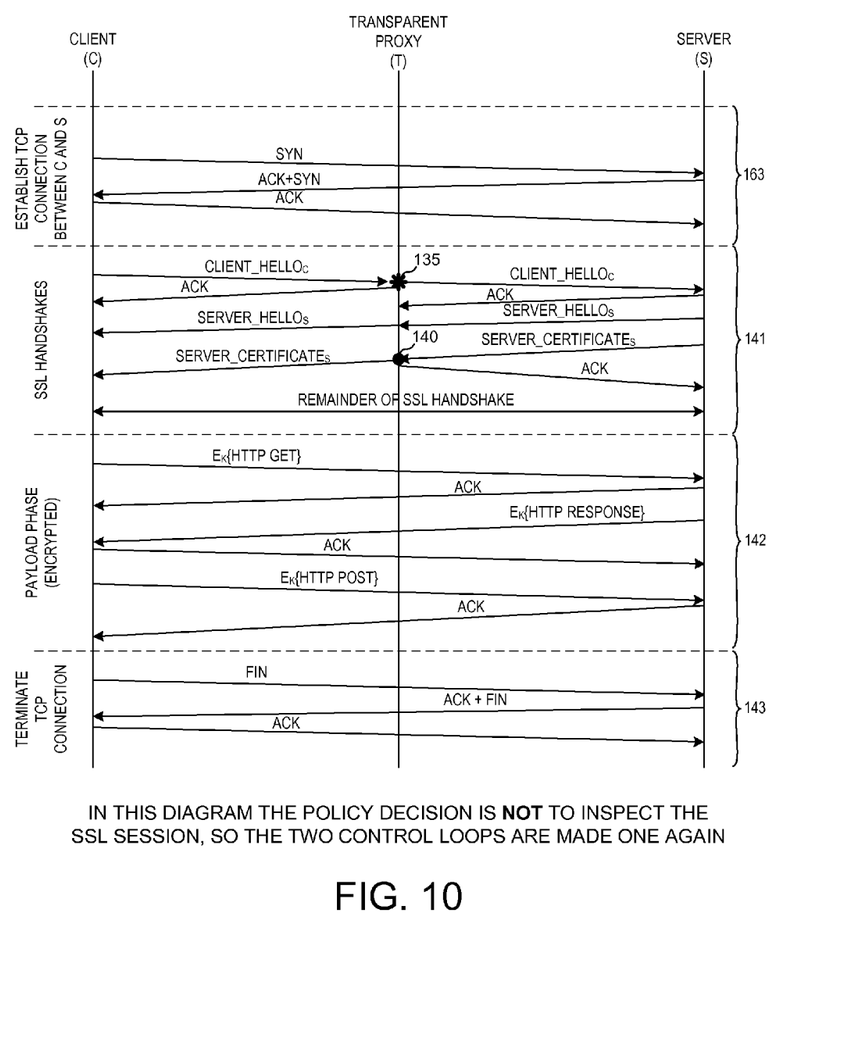
FIG. 10 is a diagram that illustrates an operation of the novel transparent proxy device of FIG. 3 in which a single TCP control loop is split into two TCP control loops and then the two TCP control loops are combined again.

FIG. 10 is a diagram that illustrates this situation. The arrows shown during time period 142 in FIG. 10 are to indicate that packets are forwarded through the proxy device 102 in unmodified form, without the delay necessary to decrypt the packets.

As shown in FIG. 4, however, the proxy device 102 does not immediately remove itself from the flow control process, but rather continues operating with two TCP control loops 136 and 137 until the proxy device 102 determines that the two endpoints of the TCP connection can continue operating without the intervening proxy device. The proxy device is responsible for TCP retransmits of packets it has sent out (to the client device or to the server device) on a TCP control loop maintained by the proxy device. The proxy device 102 stores the biggest sequence number of all unacknowledged packets that the proxy device has sent out to the client device. The proxy device also stores the biggest sequence number of the unacknowledged packets that the proxy device has sent out to the server device. For each TCP control loop, the proxy device ensures that all retransmits have been handled properly for packets the proxy device is responsible for. The proxy device does this by waiting until an ACK has been received for all unacknowledged packets. Once an ACK has been received back onto the proxy device for each packet the proxy device sent out (using one of the two TCP control loops), then the proxy device determines that it is safe to remove itself from its flow control management functions. Only then does the proxy device 102 allow subsequent packets of the TCP connection (having larger TCP sequence numbers) flow through the proxy device 102 without any changes.

Once packets are passed through the proxy device without any changes, the two TCP TCBs 138 and 139 are unused and the memory space used to store such TCP TCBs can be used for other purposes. Processing resources of the proxy device 102 that would otherwise have to be used to monitor and maintain state of the TCP connection can be used for other purposes. The proxy device 102 continues to operate (step 211) with the single TCP connection and one TCP control loop. This operation is indicated in time period 142 of FIG. 10. After the email has been communicated, one of the two application layer programs 113 or 114 initiates termination of the TCP connection. Termination of the TCP connection is as in the example of FIG. 6.

Figure 11:
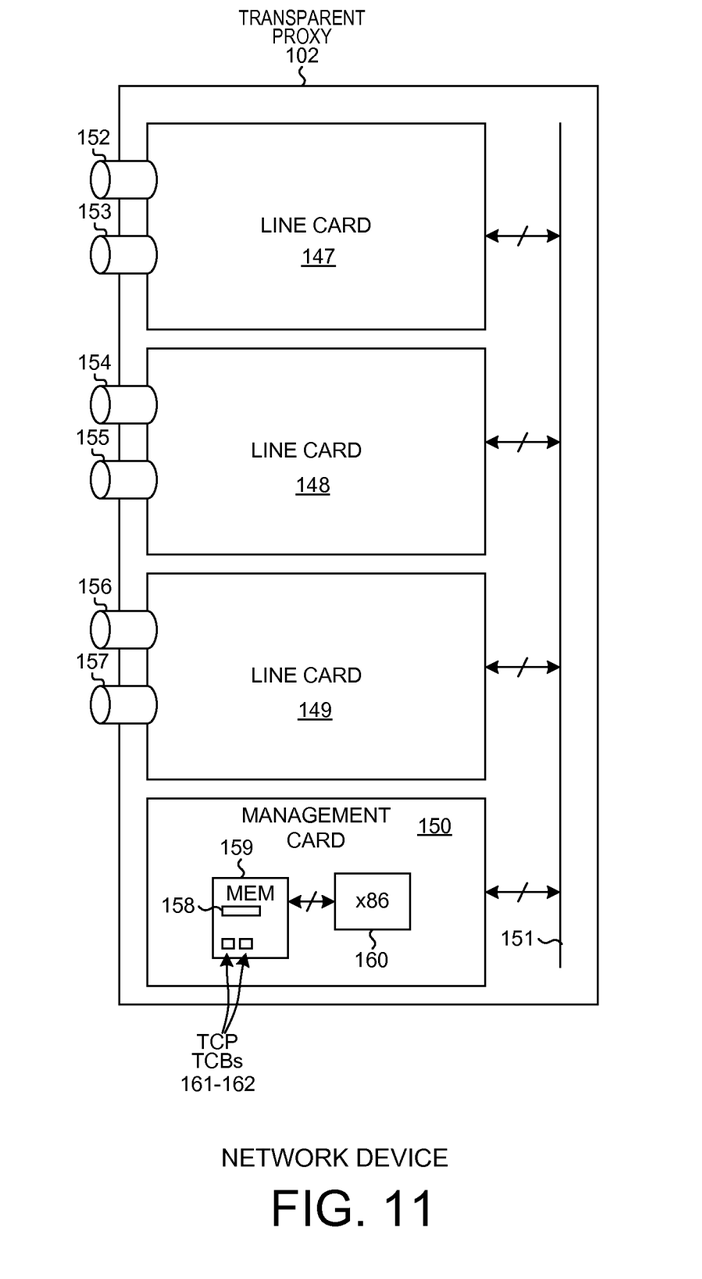
FIG. 11 is a diagram of one example of the transparent proxy device 102 of FIG. 3.

FIG. 11 is a simplified diagram of one example of the transparent proxy device 102 of FIG. 3. In this example, transparent proxy device 102 includes three line cards 147-149, a management card 150, and a backplane and backplane connector/bus 151. Reference numerals 152-157 identify physical ports, which in this case are optical fibers and their associated transceiver circuitry (not shown). Transparent proxy device 102 may receive packets from client device 101 via one of these ports, may transmit packets to client device 101 via another of these ports, may receive packets from edge router 105 via another of these ports, and may transmit packet to edge router 105 via another of these ports. Transparent proxy device 102 may communicate unencrypted information to IPS device 104 by yet another of these ports. Software (a set of processor-executable instructions) 158 stored in memory (a processor-readable medium) 159 and executing on a processor 160 (for example, a x86-architecture processor) of the management card 150 in this example manages and controls the line cards 147-149, makes a decision to split a TCP control loop of a single TCP connection into two, and also makes a decision to connect the two TCP control loops back into one. The two TCBs for managing flow of the two TCP control loops of the single TCP connection are also stored and maintained in memory 159 during a time when the two TCP control loops are operating. Although a specific architecture of an example of transparent proxy device 102 is illustrated, virtually any network device capable of TCP/IP communications can be made to carry out the method 200 of FIG. 4, including a general purpose server or a general purpose computer such as a PC. The functionality of the method 200 of FIG. 4 can be built into the stack of an operating system, such as a Windows operating system, a Linux operating system, or a FreeBSD operating system.

Although the present invention has been described in connection with certain specific embodiments for instructional purposes, the present invention is not limited thereto. The breaking of a single TCP control loop into two TCP control loops without establishing a second TCP connection and without terminating the TCP connection on the networking device is not limited to application in proxy devices, but rather is generally applicable to network devices in general. Similarly, the connecting of two TCP control loops of a single TCP connection into a single TCP control loop that controls all flow across the TCP connection is not limited to application in proxy devices, but rather is generally applicable to network devices in general. Although an example is set forth above where the decision to split the TCP control loop is based at least in part on a possible detecting of an SSL session, the splitting of a TCP control loop is not limited to use with SSL records and the SSL protocol but rather the decision to split can be made based any attribute or combination of attributes of the connection and may have nothing to do with the SSL protocol. The method of efficiently intercepting packets of an established connection is not limited to TCP, but rather extends to other connection-based transport layer protocols such as SCTP (Stream Control Transmission Protocol). Copied traffic need not be sent to a separate IPS device for recording, but rather the copied traffic can be recorded on the proxy device itself. Accordingly, various modifications, adaptations, and combinations of various features of the described embodiments can be practiced without departing from the scope of the invention as set forth in the claims.

What is claimed is:

1. A method comprising:
    (a) forwarding packets through a transparent proxy such that a single TCP (Transmission Control Protocol) connection is established between a client and server, wherein a single TCP control loop manages flow control between the client and the server across the single TCP connection in (a);
    (b) after establishment of the single TCP connection in (a) communicating an amount of information across the single TCP connection through the transparent proxy, wherein the communication of the amount of information in (b) involves communication of the amount of information between the client and the transparent proxy, wherein a first TCP control loop manages flow control for the communication of the amount of information between the client and the transparent proxy, wherein the communication of the amount of information in (b) also involves communication of the amount of information between the transparent proxy and the server, and wherein a second TCP control loop manages flow control for the communication of the amount of information between the transparent proxy and the server;
    (c) decrypting at least some of the amount of information communicated in (b);
    (d) based at least in part on a result of the decrypting determining to connect the first TCP control loop and the second TCP control loop to form the single TCP control loop;
    (e) connecting the first TCP control loop and the second TCP control loop to form the single TCP control loop and using the single TCP control loop to manage flow control across the single TCP connection; and
    (f) after the connecting of (e) forwarding packets through the transparent proxy across the single TCP connection, wherein flow control across the single TCP connection in (f) is managed by the single TCP control loop.

2. The method of claim 1, further comprising:
    monitoring packets passing through the transparent proxy across the single TCP connection;
    using information obtained during the monitoring to initialize a TCP Transmission Control Block (TCB) for the first TCP control loop; and
    using information obtained during the monitoring to initialize a TCP TCB for the second TCP control loop.

3. The method of claim 1, further comprising:
    detecting an SSL (Secure Sockets Layer) handshake signature after the forwarding of (a); and
    in response to the detecting of the SSL handshake signature splitting the single TCP control loop of (a) into the first and second TCP control loops of (b).

4. The method of claim 3, wherein the SSL handshake signature is a signature of an SSL session, the method further comprising:
    storing a policy on the transparent proxy;
    receiving a certificate onto the transparent proxy across the TCP connection;
    applying the policy to the certificate; and
    based at least in part on a result of the applying determining to intercept the SSL session.

5. The method of claim 3, further comprising:
    storing a policy on the transparent proxy;
    receiving a certificate onto the transparent proxy across the TCP connection;
    applying the policy to the certificate; and based at least in part on a result of the applying determining to connect the first TCP control loop and the second TCP control loop to form a single TCP control loop.

6. A method comprising:

communicating information through a transparent proxy across a single TCP (Transmission Control Protocol) connection, wherein the single TCP connection is between a client and a server, wherein flow control for communication across the TCP connection between the client and the transparent proxy is managed by a first TCP control loop, wherein flow control for communication across the TCP connection between the transparent proxy and the server is managed by a second TCP control loop, wherein at least some of the information communicated via the single TCP connection is decrypted, wherein based at least in part on a result of the decryption a determination is made to connect the first TCP control loop and the second TCP control loop; and combining the first TCP control loop and the second TCP control loop to form a single TCP control loop, wherein packets are forwarded through the transparent proxy across the single TCP connection, and wherein the single TCP connection is managed by the single TCP control loop.

7. The method of claim 6, further comprising:

maintaining a first TCP Transmission Control Block (TCB) on the transparent proxy for the first TCP control loop; and maintaining a second TCP Transmission Control Block (TCB) on the transparent proxy for the second TCP control loop.

8. The method of claim 6, wherein the information is communicated as payloads of packets, wherein the single TCP connection involves two flows, wherein all packets of a first of the flows have the same TCP source port, the same TCP destination port, and same IP (Internet Protocol) source address and the same IP destination address, and wherein all packets of a second of the flows have the same TCP source port, the same TCP destination port, and same IP source address and the same IP destination address.

9. The method of claim 6, wherein the transparent proxy does not terminate the single TCP connection.

10. The method of claim 6, further comprising:

communicating packets through the transparent proxy such that the client and the server establish the single TCP connection.

11. The method of claim 6, wherein the combining is performed without terminating the single TCP connection, and wherein the single TCP control loop after being formed manages flow control between the client and the server.

12. A method comprising:

(a) maintaining a first TCP (Transmission Control Protocol) Transmission Control Block (TCB) on a second network device;

(b) using the first TCP TCB to manage flow control across a first portion of a single TCP connection between a first network device and the second network device;

(c) maintaining a second TCP TCB on the second network device;

(d) using the second TCP TCB to manage flow control across a second portion of the single TCP connection between the second network device and a third network device, wherein the single TCP connection is between the first network device and the third network device;

(e) decrypting at least some information communicated via the single TCP connection;

(f) based at least in part on a result of the decrypting of (e) determining to combine the flow control across the first portion of the single TCP connection with the flow control across the second portion of the single TCP connection to form a single TCP flow control; and (g) combining the flow control across the first portion of the single TCP connection with the flow control across the second portion of the single TCP connection to form the single TCP flow control, wherein packets are forwarded through the second network device across the single TCP connection, wherein the single TCP connection is managed by the single TCP flow control, wherein (a) through (d) and (g) are performed by the second network device.

13. The method of claim 12, wherein the first TCP TCB is used in (b) by a first TCP control loop that manages the flow control across the first portion of the TCP connection, and wherein the second TCP TCB is used in (d) by a second TCP control loop that manages the flow control across the second portion of the TCP connection.

14. The method of claim 12, further comprising:

(h) monitoring information passing across the TCP connection; and (I) initializing the first TCP TCB and the second TCP TCB based at least in part on a result of (h), wherein (h) and (i) are performed by the second network device, and wherein (h) and (i) occur before any one of (a) through (d).

15. The method of claim 12, further comprising:

(h) after a period of time of using the first and second TCP TCBs to manage flow control across the first and second portions of the TCP connection communicating packets of the TCP connection through the second network device without using the first and second TCP TCBs to manage flow control across the TCP connection such that a majority of flow control for the TCP connection is managed by the first and third network devices, wherein the majority of the packets are not modified.

16. A network device comprising:

a memory for storing a first TCP (Transmission Control Protocol) Transmission Control Block (TCB) and a second TCP TCB, wherein the first TCP TCB and the second TCP TCB are TCBs; and a first means for using the first TCP TCB to manage flow control across a first portion of a single TCP connection and for using the second TCP TCB to manage flow control across a second portion of the single TCP connection; and a second means, wherein at least some information communicated via the single TCP connection is decrypted, wherein a decision is made to combine the flow control across the first portion of the single TCP connection and the flow control across the second portion of the TCP connection based at least in part on a result of the decryption, wherein the second means is also for combining the flow control across the first portion of the single TCP connection and the flow control across the second portion of the single TCP connection to form the single TCP flow control, wherein packets are forwarded through the second means across the single TCP connection, wherein the single TCP connection is managed by the single TCP flow control.

17. The network device of claim 16, wherein the single TCP connection involves a pair of flows of packets, wherein the packets flow between a client device and a server device, wherein all packets of the pair of flows pass through the network device, wherein the network device is not the client device, and wherein the network device is not the server device.

18. The network device of claim 16, wherein flow control across the first portion of the single TCP connection is managed by a first TCP control loop, wherein flow control across the second portion of the single TCP connection is managed by a second TCP control loop, and wherein the second means is also for connecting the first and second TCP control loops to form a single TCP control loop that manages flow control across the single TCP connection.

19. The network device of claim 16, wherein the single TCP connection is between a client device and a server device, and wherein the second means is also for allowing packets to be forwarded through the network device such that the single TCP connection is established by the client device and by the server device.

20. A network device, comprising:
a memory; and
means for:
(a) decrypting first information passing across a TCP (Transmission Control Protocol) connection, wherein the first information is communicated via the TCP connection through the network device;
(b) as a result of the decrypting of (a) making a determination that the first information has a first characteristic;
(c) in response to the making of the determination in (b) splitting a single TCP control loop that manages flow across the TCP connection into two TCP control loops, wherein after the splitting the memory stores two TCP Transmission Control Blocks (TCBs) for the TCP connection;
(d) after the splitting of (c) monitoring second information communicated via the TCP connection and making a determination that the second information does not have a second characteristic;
(e) in response to the making of the determination in (d) connecting the two TCP control loops into a single TCP control loop such that the single TCP control loop manages flow across the TCP connection, wherein packets are forwarded through the network device across the single TCP connection, wherein flow control across the TCP connection is managed by the single TCP control loop, and wherein an acknowledgement signal received by the single TCP control loop is transmitted by the single TCP control loop; and
(f) after the connecting of (e) communicating third information through the network device via the TCP connection, wherein at no time from the monitoring of (a) to the communicating of (f) is the TCP connection terminated on the network device, and wherein all of the first information, the second information, and the third information is at least received onto the network device via the TCP connection.

21. The network device of claim 20, wherein the determination in (b) that that first information has a first characteristic is a determination that the first information exhibits an SSL (Secure Sockets Layer) signature.

22. The network device of claim 21, wherein the determination in (d) that the second information does not have the second characteristic is a determination that the TCP connection is not carrying packets of an SSL session that has certain characteristics.

23. A method comprising:
(a) operating a network device such that information is communicated across a TCP (Transmission Control Protocol) connection and through the network device, wherein the TCP connection is not terminated on the network device, and wherein flow across the TCP connection is managed by a single TCP control loop, wherein packets are forwarded through the network device across the single TCP connection, wherein flow control across the TCP connection is managed by the single TCP control loop and wherein an acknowledgement signal received by the single TCP control loop is transmitted by the single TCP control loop;
(b) after the operating of (a) splitting the single TCP control loop into a first TCP control loop and a second TCP control loop, wherein after the splitting the network device maintains a first TCP Transmission Control Blocks (TCB) for the first TCP control loop, and wherein after the splitting the network device maintains a second TCP TCB for the second TCP control loop;
(c) after the splitting of (b) decrypting information passing via the TCP connection into the network device; and
(d) based at least in part on a result of the decrypting of (c) making a determination to take a particular action, wherein (a) through (d) are performed by the network device, and wherein at no time between the operating of (a) and the making of the determination of (d) is the TCP connection terminated on the network device.

24. The method of claim 23, wherein the decrypting of (c) involves decrypting at least some of the information passing via the TCP connection into the network device.

25. The method of claim 23, wherein the decrypting of (c) involves: 1) combining the payloads of a plurality of packets and thereby forming an SSL record, 2) decrypting the SSL record, and 3) analyzing a result of the decrypting.

26. The method of claim 23, wherein the particular action in (d) involves: 1) forwarding at least some of the information from the network device in the form of packets to a recording device, and 2) communicating the information via the TCP connection out of the network device.

* * * * *